Dec. 14, 1965   J. C. KAZIMIER   3,223,280
MOLDED BEVERAGE CARRIER
Filed July 29, 1964
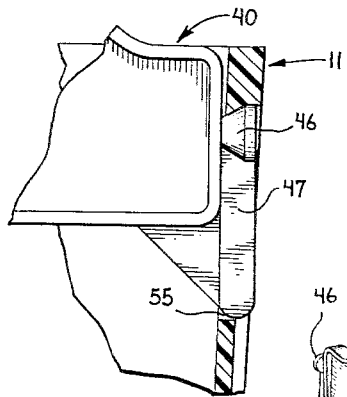
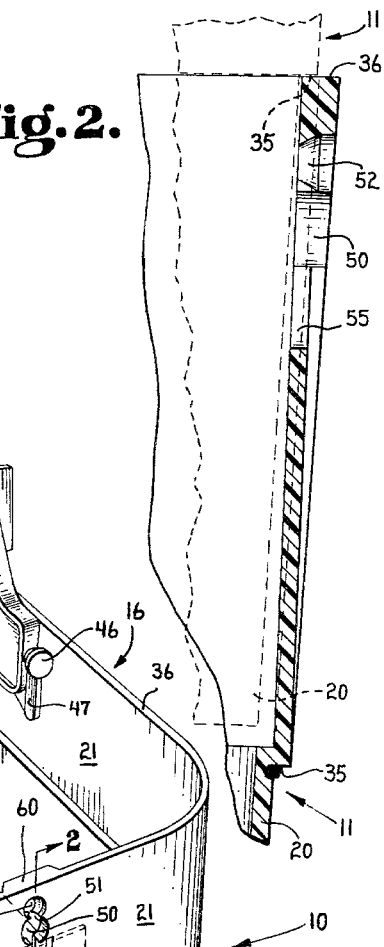
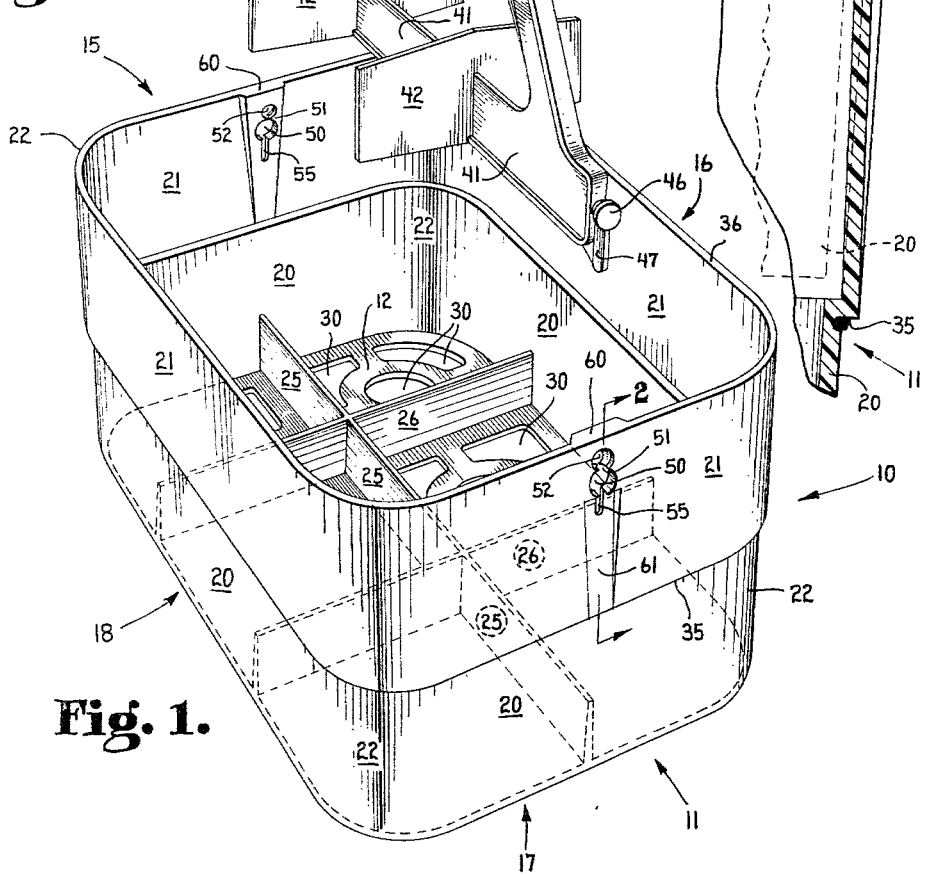
INVENTOR.
JULIAN C. KAZIMIER
BY *Lockwood, Woodard, Smith & Weikart*
Attorneys

United States Patent Office 3,223,280
Patented Dec. 14, 1965

3,223,280
MOLDED BEVERAGE CARRIER
Julian C. Kazimier, Edinburg, Ind., assignor to Amos-Thompson Corporation, Edinburg, Ind., a corporation of Indiana
Filed July 29, 1964, Ser. No. 385,899
2 Claims. (Cl. 220—102)

This invention relates to bottle carriers.

Consumer demand for bottled drinks has made it desirable and necessary for the beverage bottling and distributing industry to provide bottle carriers by means of which the consumer may conveniently receive and transport a plurality of beverage filled bottles and conveniently return the empty bottles. In order to facilitate the shipping of such carriers, for example to the bottler, it is desirable that the carriers be capable of being shipped in stacked condition. Consequently, one object of the present invention is to provide a bottle carrier that is capable of being stacked with other such bottle carriers in such a manner as to occupy a relatively small space.

Another object of the invention is to provide an improved bottle carrier.

Related objects and advantages will appear as the description proceeds.

One embodiment of the present invention might include a bottle carrier comprising a receptacle having a bottom and upright sides with an open top, said receptacle being shaped to nest within and to have nested therein other receptacles which are identical to said receptacles, a handle having bottle separators formed integrally thereon, said handle being detachably connected within said receptacle.

The full nature of the invention will be understood from the accompanying drawings and the following description and claims:

FIG. 1 is a perspective view of a bottle carrier embodying the present invention.

FIG. 2 is a vertical section taken along the line 2—2 of FIG. 1 in the direction of the arrows and showing in dotted lines a further identical carrier nested within the first mentioned carrier.

FIG. 3 is a fragmentary section similar to the solid line portion of FIG. 2 but additionally showing the handle of the present invention detachably connected to the receptacle of the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a bottle carrier 10 composed of a flexible resilient material such as, for example, molded polyethylene. The carrier 10 includes a rectangular receptacle 11 having a bottom 12 and four generally upright sides 15, 16, 17 and 18.

The sides 15–18 include an upwardly and outwardly tapering lower portion 20 and an outwardly stepped upper edge potrion 21. Each of the sides 15–18 smoothly joins the adjacent sides thereto by radiused corners 22. The bottom 12 of the receptacle and the sides 15–18 have formed integrally therewith bottle separators 25 and 26 which extend longitudinally and transversely respectively of the receptacle 11. The bottom 12 is formed with a plurality of openings 30 primarily to save material.

Referring to FIG. 2, a plurality of the receptacles 11 may be stacked in the manner illustrated with the lower portion 20 of each receptacle received within the upper portion 21 of a receptacle therebelow and with the shoulder 35 of the upper receptacle resting upon the upper edge 36 of the lower receptacle. It can be appreciated that by such stacking, the total top to bottom height of a plurality of the receptacles is appreciably reduced as compared to the sum of the top to bottom heights of the individual receptacles.

A handle 40 can be detachably connected to the receptacle 11 as shown in FIG. 3. The handle 40 incorporates or has formed integrally therewith longitudinally extending bottle separators 41 and transversely extending bottle separators 42. When the handle 40 is mounted upon the receptacle 11, the bottle separators 41 and 42 are properly located to prevent striking together of the various bottles and to maintain the various bottles in their proper positions in the carrier.

The handle 40 has a suitable hand opening 45 extending therethrough and has studs 46 formed integrally on the opposite ends thereof. Fins 47 depend from the studs 46 and are formed integrally with the studs 46 as well as with the longitudinal bottle separator 41. Each of the studs 46 tapers from a larger distal end circular shape to a smaller proximal end circular shape.

An opposite pair of the upper edge portions 21 is formed with cylindrical openings 50 which are sufficiently large to freely pass therethrough the studs 46. Immediately above the first openings 50 and in communication therewith by means of necks 51 are second openings 52 which are complementary in shape to the studs 46. Immediately below the openings 50 and in communication therewith are openings 55 which are configured complementarily to the fins 47. The total top to bottom length of each fin-stud combination is approximately equal to the total top to bottom length of its respective group of openings 51, 50 and 55.

In order to connect the handle 40 to the receptacle 11, the studs 46 are first inserted through the openings 50. This operation does not require an excessive amount of force because the studs 46 are smaller than the openings 50 and the material of which the receptacle and handle are made is resiliently flexible. It should be noted, however, that the fins 47 will engage the inner surface of the portions 21 because the fins will be positioned below the openings or slots 55. Thus, it will be necessary to push inwardly the upper central areas of the portions 21 in order to project the studs 46 through the openings 50.

Next, the handle 40 is pulled upwardly relative to the receptacle 11 causing the studs 46 to snap into the respective openings 52 and causing the fins 47 to snap into the slots 55. The handle 40 is then securely attached to the receptacle 11 but can be disconnected therefrom by a reversal of the above steps.

It will be noted that the upper portion 21 of the sides 15 and 17 are reinforced or thickened at 60 in order to better retain their shape and strength under the force of the lifting of the receptacle with bottles therein by the handle 40. In order to save on materials, however, the outer lower central area 61 of each of the portions 21 of the sides 15 and 17 is recessed.

It will be evident from the above description that the present invention provides an improved bottle carrier which is capable of being stacked with other such bottle carriers in such a manner as to occupy a relatively small space. It will also be evident that the handle 40 of the present invention not only is of great utility in lifting the receptacle but also provides highly efficient means for preventing the bottles within the receptacle from striking one another and retains them in their appropriate positions within the receptacle.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A bottle carrier comprising a generally rectangular receptacle having a bottom and four upright sides with an open top, said sides including an upwardly and outwardly tapering lower portion and an outwardly stepped upper edge portion configured for reception of the lower portion of an identical carrier, said receptacle having formed integrally therein within said lower portion separators for the bottles, a handle for said receptacle, said handle having a hand opening therethrough centrally thereof and a further plurality of separators for the bottles formed integrally therewith, said handle having a pair of studs formed on the opposite ends thereof, said studs tapering from a larger distal end portion to a smaller proximal end portion and each having a depending fin integral therewith and integral with said handle, an opposite pair of said sides each having a first opening sufficiently large to easily pass a respective stud, each of said sides also having a second and third further openings in communication with said first opening with said second opening above said first opening and having a shape complementary to a respective stud, each of said third openings having a shape complementary to a respective fin with the total top to bottom length of a respective group of first, second and third openings being approximately equal to the length of a stud with its fin, said carrier and handle being formed of resilient flexible material permitting insertion of said stud and fin in a respective group of first, second and third openings, each of said first and second openings being joined by a neck which is sufficiently narrow to provide a certain amount of resistance to a respective stud moving therebetween but is sufficiently wide to pass the stud.

2. A bottle carrier comprising a generally rectangular elongated receptacle having a bottom and four upright sides with an open top, said sides including an upwardly and outwardly tapering lower portion and an outwardly stepped upper edge portion configured for reception of the lower portion of an identical carrier, a handle for said receptacle, said handle having a hand opening therethrough centrally thereof and a plurality of separators for the bottles formed integrally therewith, some of said separators extending longitudinally of said receptacle and some extending transversely thereof, said handle having a pair of studs formed on the opposite ends thereof, said studs tapering from a larger distal end portion to a smaller proximal end portion and each having a depending fin integral therewith and integral with said handle, an opposite pair of said sides each having a first opening sufficiently large to easily pass a respective stud, each of said sides also having second and third further openings in communication with said first opening with said second opening above said first opening and having a shape complementary to a respective stud, each of said third openings having a shape complementary to a respective fin with the total top to bottom length of a respective group of first, second and third openings being approximately equal to the length of a stud with its fin, said carrier and handle being formed of resilient flexible material permitting insertion of said stud and fin in a respective group of first, second and third openings, each of said first and second openings being joined by a neck which is sufficiently narrow to provide a certain amount of resistance to a respective stud moving therebetween but is sufficiently wide to pass the stud, said studs and fins being seated within respective first, second and third openings with said transversely extending separators engaging the inside of said receptacle.

References Cited by the Examiner

UNITED STATES PATENTS

| | | | |
|---|---|---|---|
| Re. 25,707 | 1/1965 | De Chelbor | 220—21 |
| 3,055,542 | 9/1962 | Russo. | |

THERON E. CONDON, *Primary Examiner.*